(12) United States Patent
Bilandzija et al.

(10) Patent No.: US 10,457,219 B2
(45) Date of Patent: Oct. 29, 2019

(54) PROTECTION DEVICE FOR A VEHICLE INTERIOR COMPARTMENT

(71) Applicants: Goran Bilandzija, Reichenbach (DE); Markus Zaiser, Köngen (DE); Steffen Röschinger, Lorch (DE)

(72) Inventors: Goran Bilandzija, Reichenbach (DE); Markus Zaiser, Köngen (DE); Steffen Röschinger, Lorch (DE)

(73) Assignee: BOS GMBH & CO. KG, Ostfildern (DE)

( * ) Notice: Subject to any disclaimer, the term of this patent is extended or adjusted under 35 U.S.C. 154(b) by 162 days.

(21) Appl. No.: 15/664,684

(22) Filed: Jul. 31, 2017

(65) Prior Publication Data

US 2018/0050643 A1 Feb. 22, 2018

(30) Foreign Application Priority Data

Aug. 19, 2016 (DE) .................. 10 2016 215 599

(51) Int. Cl.
*B60R 5/04* (2006.01)
*B60R 21/06* (2006.01)

(52) U.S. Cl.
CPC .............. *B60R 5/047* (2013.01); *B60R 21/06* (2013.01)

(58) Field of Classification Search
CPC ......... B60R 5/047; B60R 21/06; B60R 5/048; B60R 5/045; B60J 1/2044; B60J 1/2047; B60J 1/2052

(Continued)

(56) References Cited

U.S. PATENT DOCUMENTS 5,860,466 A * 1/1999 Kao ................. B60J 1/2072
160/23.1
6,003,920 A * 12/1999 Crisp ................. B60R 5/047
160/265

(Continued)

FOREIGN PATENT DOCUMENTS

DE 10 2009 036 606 B3 8/2010
DE 10 2009 023 723 A1 12/2010

(Continued)

OTHER PUBLICATIONS

Search Report of European Patent Office issued in European Application No. 17 18 0976 with English translation of category of documents cited dated Dec. 21, 2017 (7 pages).

(Continued)

*Primary Examiner* — Brent W Herring
(74) *Attorney, Agent, or Firm* — Flynn Thiel, P.C.

(57) ABSTRACT

Protection device for a vehicle interior compartment including a flexible planar structure displaceable between rest and protective positions. On a face end region of the planar structure, a dimensionally stable guiding profile is provided, which is guided in vehicle-fixed guiding tracks. Each side of the guiding profile is associated with a coupling member in operative connection with an entrainer guided in the respective guiding track by a retaining device acting in a force-limited manner. The entrainers are shiftable in mutual synchronization within the guiding tracks by a drive system. The coupling members are in operative connection to the entrainers eccentrically offset in relation to a central longitudinal axis of the guiding profile, and the coupling members are removable from the entrainers in response to external strains of the guiding profile in directional components which are orthogonal in relation to a plane of deployment of the planar structure.

7 Claims, 4 Drawing Sheets

(58) Field of Classification Search
USPC ....... 296/37.1, 98; 160/290.1, 370.21, 323.1, 160/274, 267.1
See application file for complete search history.

(56) References Cited

U.S. PATENT DOCUMENTS

| | | | |
|---|---|---|---|
| 6,416,103 B1 | 7/2002 | Laudenbach et al. | |
| 6,592,165 B2* | 7/2003 | Ament | B60R 5/047 296/37.16 |
| 7,207,613 B2* | 4/2007 | Walter | B60R 21/06 280/748 |
| 7,445,262 B2* | 11/2008 | Zaiser | B60R 5/047 160/370.22 |
| 7,537,265 B2 | 5/2009 | Hori et al. | |
| 7,628,437 B2* | 12/2009 | Zaiser | B60R 5/047 160/370.22 |
| 7,673,921 B2* | 3/2010 | Hirayama | B60R 5/047 296/100.15 |
| 7,857,035 B2* | 12/2010 | Miyachi | B60J 1/2027 160/265 |
| 8,167,349 B1* | 5/2012 | Cha | B60R 5/047 160/370.22 |
| 9,511,733 B2* | 12/2016 | Maier | B60R 21/06 |
| 9,669,691 B2* | 6/2017 | Gauger | B60J 7/202 |
| 9,987,991 B2* | 6/2018 | Seel | B60R 13/013 |
| 2005/0116486 A1* | 6/2005 | Walter | B60R 21/06 296/24.43 |
| 2005/0179275 A1* | 8/2005 | Zaiser | B60R 5/047 296/24.3 |
| 2007/0194584 A1* | 8/2007 | Zaiser | B60R 5/047 296/24.43 |
| 2008/0277077 A1* | 11/2008 | Rockelmann | B60J 1/2041 160/268.1 |
| 2008/0277957 A1* | 11/2008 | Hirayama | B60R 5/047 296/37.16 |
| 2009/0033115 A1* | 2/2009 | Zaiser | B60R 5/047 296/24.43 |
| 2012/0091745 A1* | 4/2012 | Cha | B60R 5/047 296/37.16 |
| 2013/0146237 A1* | 6/2013 | Lin | B60J 1/2044 160/267.1 |
| 2013/0153160 A1* | 6/2013 | Lin | E06B 9/42 160/267.1 |
| 2016/0303958 A1* | 10/2016 | Gauger | B60J 7/202 |
| 2017/0113522 A1* | 4/2017 | Rockelmann | B60J 1/2041 |

FOREIGN PATENT DOCUMENTS

| | | |
|---|---|---|
| EP | 1 084 907 A2 | 3/2001 |
| JP | 2003127777 A | 5/2003 |
| JP | 2007-153128 A | 6/2007 |

OTHER PUBLICATIONS

Office Action of German Patent Office issued in Application No. 10 2016 215 599.7 dated Mar. 9, 2017 (5 pages).

\* cited by examiner

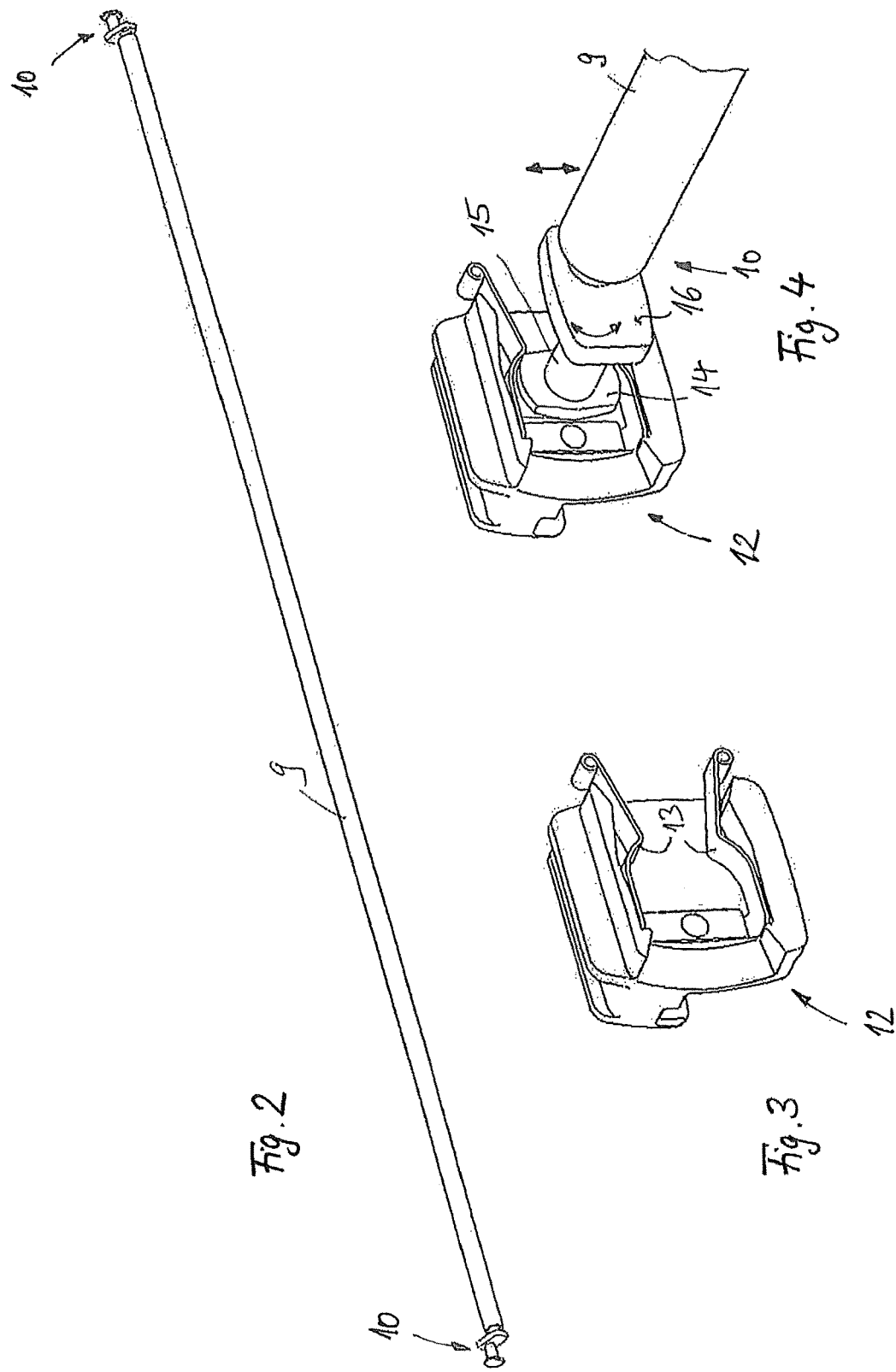

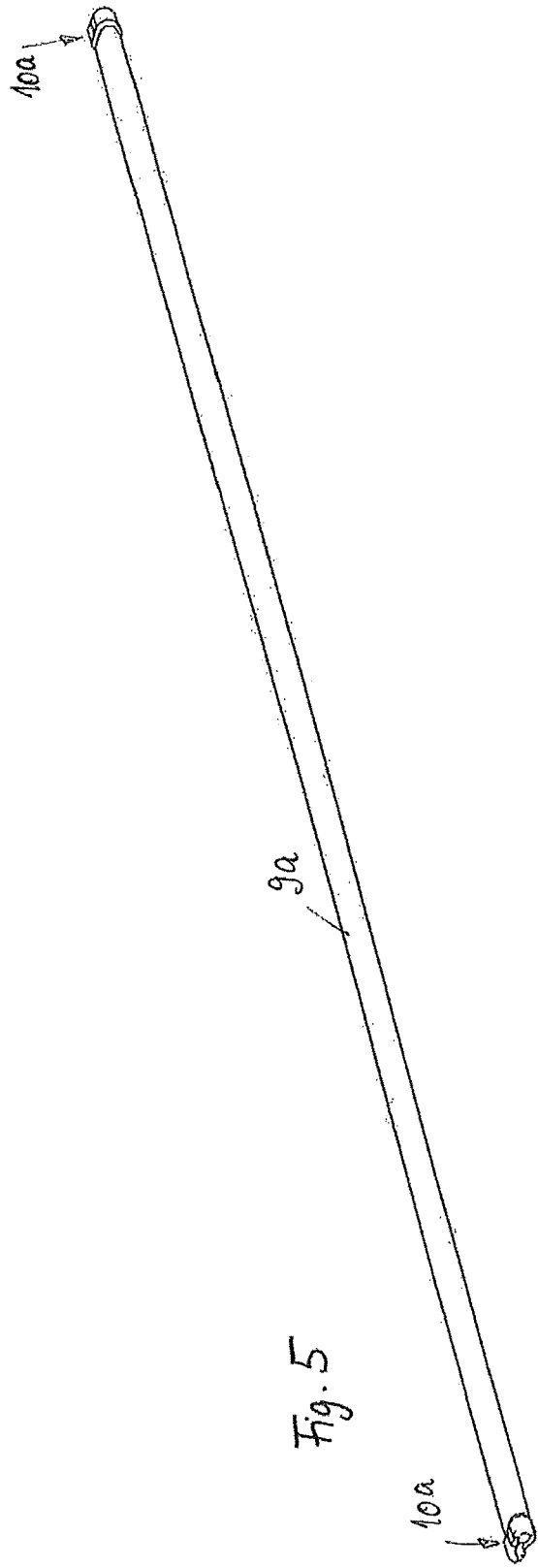
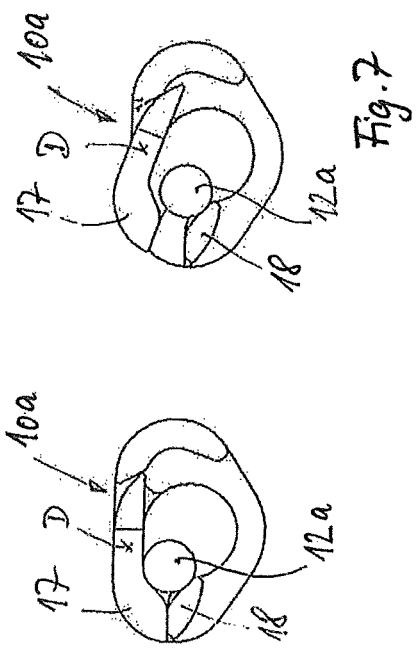

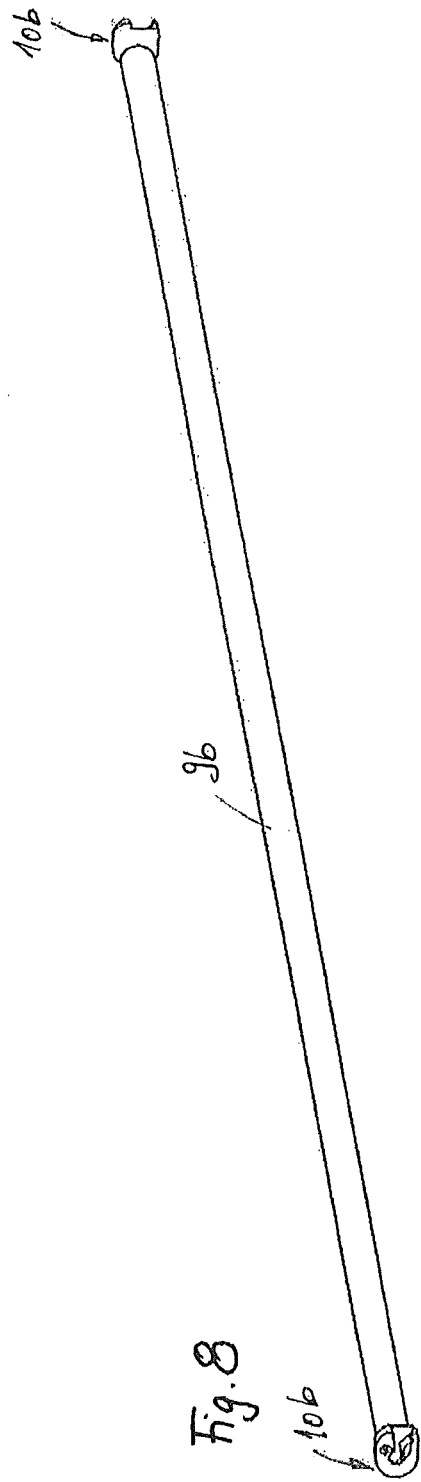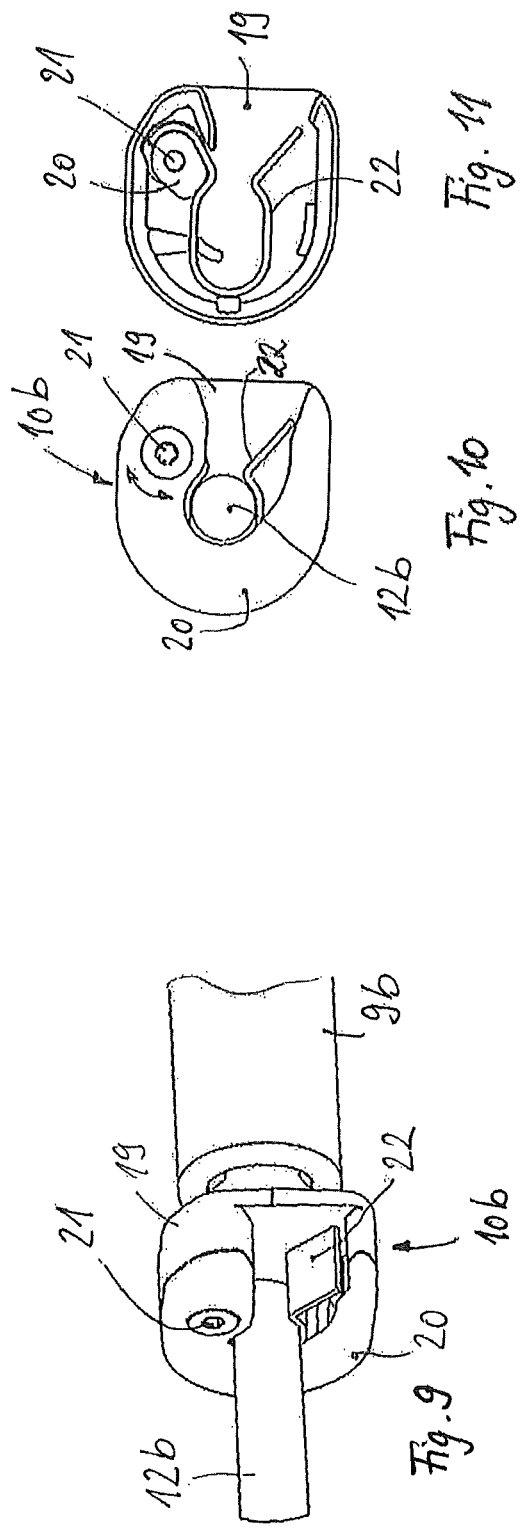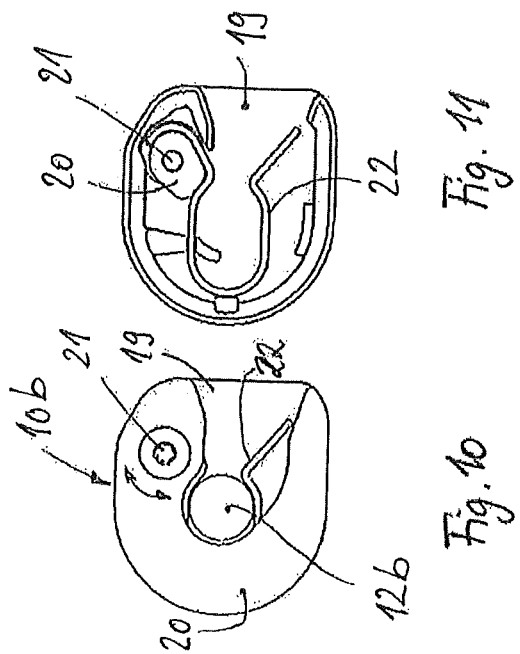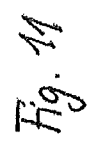

PROTECTION DEVICE FOR A VEHICLE INTERIOR COMPARTMENT

CROSS-REFERENCE TO RELATED APPLICATIONS

This claims priority from German Patent Application No. 10 2016 215 599.7, filed on Aug. 19, 2016, the disclosure of which is hereby incorporated by reference in its entirety.

FIELD OF THE INVENTION

The invention relates to a protection device for a vehicle interior compartment, comprising a flexible planar structure which is displaceable between a rest position and a protective position, and which, on a face end region, is provided with a dimensionally stable guiding profile, which is guided in vehicle-fixed guiding tracks on opposite face sides thereof, wherein each face side of the guiding profile is associated with a coupling member which is in operative connection with an entrainer guided in the respective guiding track by means of a retaining device acting in a force-limited manner, wherein the entrainers are shiftable in mutual synchronization within the guiding tracks by means of a drive system.

BACKGROUND OF THE INVENTION

Such a protection device is disclosed in EP 1 084 907 A2. The known protection device has guiding rails on opposite side walls of a loading compartment as guiding tracks, wherein a respective entrainer is guided. The protection device is provided with a flexible protective structure which is mounted to be windable and unwindable on a winding shaft. The flexible protective structure includes a dimensionally stable pull-out profile on a face end region that is in front in the pull-out direction, which profile is held in retaining devices associated with the entrainers and acting in a force-limited manner, in order to be displaced alongside the guiding rails and, thus, alongside the loading compartment.

SUMMARY OF THE INVENTION

An object of the invention is to provide a protection device of the type mentioned in the introduction, which is improved in regard to preventing damages due to improper handling.

This object is achieved in that the coupling members are in operative connection to the entrainers eccentrically offset in relation to a central longitudinal axis of the guiding profile, and in that the coupling members are removable from the entrainers in response to external strains of the guiding profile in directional components which are orthogonal in relation to a plane of deployment of the planar structure. With the prior art, orthogonal strains cause damages of the guiding profile and the protection device. With the solution according to the invention, said issues are prevented, since in case of strains on the guiding profile in directional components which are orthogonal in relation to the plane of deployment of the planar structure, owing to the eccentric offset of the coupling members, torques cause twisting of the retaining devices acting in a force-limited manner and the coupling members, respectively, which cause removal of the coupling members from the entrainers even in case of strains in said different directional components. The solution according to the invention is with particular advantage adapted to an essentially horizontal loading compartment cover in a passenger vehicle, wherein unintentional movements of an operator during loading or unloading of cargo can exert corresponding strains on the guiding profile. According to the invention, instead of damage to the guiding profile, there is merely a removal of the guiding profile from the entrainers occurring, which are guided in the vehicle-fixed guiding tracks. In particular guiding rails are provided as vehicle-fixed guiding tracks, which rails are integrated in opposite loading compartment side walls, and which extend shortly below a vehicle interior sill and, thus, shortly below a vehicle belt line. The solution according to the invention is also provided for other types of protection devices in a vehicle interior, in particular for sun screen devices.

In an embodiment of the invention, the retaining device acting in a force-limited manner is associated with the entrainer or the coupling member. The guiding profile includes a respective coupling member on each of its opposite face sides. Similarly, corresponding guiding tracks are also provided on opposite sides of the vehicle interior, in which a respective entrainer for entraining, release or accommodation of the respective coupling member of the guiding profile is provided. Correspondingly, a respective retaining device acting in a force-limited manner is provided also on each of the two face sides of the guiding profile, which retaining devices are provided either on the respective coupling member or on the respective entrainer. The force-limited action of the retaining device is preferably embodied in a mechanical feature.

In a further embodiment of the invention, the coupling members are firmly disposed on the guiding profile. The coupling members can be integrally molded to the respective face side of the guiding profile or be removably or non-removably fixed to the respective face side.

In a further embodiment of the invention, each coupling member has an outer contour with a narrow engagement surface and a wide engagement surface offset in the circumferential direction, wherein the engagement surfaces are alternatively associated with the retaining device acting in a force-limited manner as a function of the rotational position of the coupling member. As a result, the retaining device acting in a force-limited manner can retain or release the coupling member in response to the rotational position of the coupling member.

In a further embodiment of the invention, the retaining device acting in a force-limited manner is disposed on the coupling member or on the entrainer to be rotatable about a rotational axis which is oriented in parallel to the central longitudinal axis of the guiding profile. Due to said parallel, but eccentric orientation of the rotational axis in relation to the central longitudinal axis of the guiding profile, corresponding strains on the guiding profile with directional components orthogonal to the plane of deployment of the flexible planar structure necessarily cause torque on the retaining device, whereby a release of the retaining device in the corresponding directional component is achievable. What is meant by the expression "directional component" is not a resultant direction, but rather at least one directional component, and the resultant direction of a corresponding strain on the guiding profile is composed thereof.

In a further embodiment of the invention, the retaining device acting in a force-limited manner includes at least one retaining leg movable in a force-limited manner which flanks an outer contour of the coupling member or of the entrainer. With particular advantage, at least one unilaterally clamped leaf spring is provided as the retaining device, which spring can be curved in such a manner that it encloses part of an outer contour of the coupling member or of the entrainer in a form-fitting manner. The elastic resilience of the leaf spring causes the force-limited operative connection and, as a result, force-limited release of the retaining device.

Further advantages and features of the invention will become apparent from the claims and from the description below of preferred exemplary embodiments of the invention which are illustrated with reference to the drawings.

BRIEF DESCRIPTION OF THE DRAWINGS

FIG. 2 shows an enlarged perspective illustration of part of a protection device according to FIG. 1 in the region of a guiding profile of a flexible planar structure;

FIG. 3 shows a functional unit of the protection device according to FIGS. 1 and 2 for accommodation of a face side of the guiding profile according to FIG. 2;

FIG. 4 shows the illustration according to FIG. 3, however, with accommodated face side of the guiding profile;

FIG. 5 shows a guiding profile with laterally disposed coupling members according to another embodiment of a protection device according to the invention;

FIG. 6 shows a side view of the guiding profile according to FIG. 5 with accommodated loading compartment-related entrainer;

FIG. 7 shows the illustration according to FIG. 6 in a removed position;

FIG. 8 shows a perspective illustration of a guiding profile for a further embodiment of a protection device according to the invention according to FIG. 1;

FIG. 9 shows an enlarged illustration of a section of the guiding profile in the region of a coupling to a loading compartment-related entrainer;

FIG. 10 shows a side view of the illustration according to FIG. 9; and

FIG. 11 shows a cross-section through the functional unit according to FIGS. 9 and 10.

DETAILED DESCRIPTION

Figure 1:
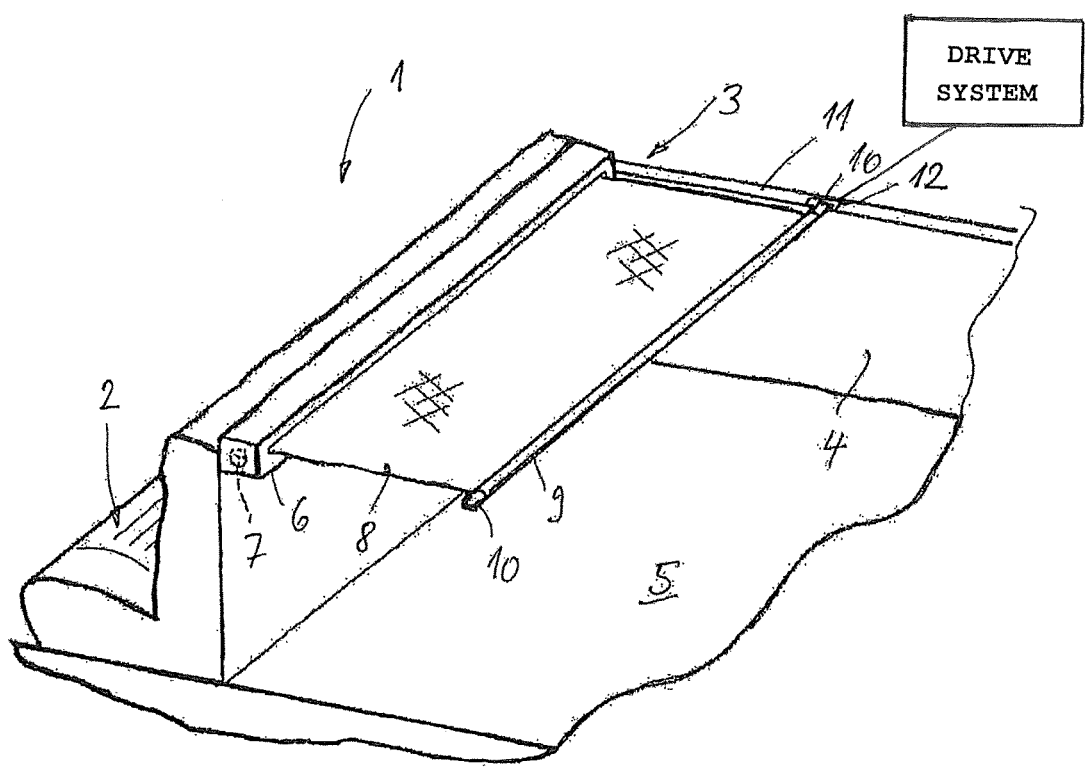
FIG. 1 shows a schematic illustration of an embodiment of a protection device according to the invention for a loading compartment within a vehicle interior of a passenger vehicle.

An automotive vehicle in the form of a passenger vehicle includes, according to FIG. 1, a vehicle interior compartment 1 which is provided with a loading compartment on the vehicle rear side. The rear-sided loading compartment includes a loading compartment floor 5 which is delimited towards each of opposite longitudinal sides by a respective loading compartment side wall 4. As seen in the ordinary direction of driving, the loading compartment is delimited towards the front by a seat back arrangement of a rear seat bench 2. The loading compartment is associated with a protection device 3 which will be described in more detail below with reference to FIGS. 1 to 11.

The protection device 3 has a dimensionally stable cartridge housing 6 which is disposed fixed to the vehicle behind the seat back arrangement of the rear seat bench 2 and extends over the width of the loading compartment in the vehicle transverse direction. A winding shaft 7 is rotatably mounted in the cartridge housing 6, and a flexible planar structure 8 in the form of a covering sheet is held thereon to be wound up and off. The flexible planar structure 8 is pulled out rearward towards a vehicle rear through a longitudinal slot in the cartridge housing 6 and later on drawn back in through said longitudinal slot. There is permanent torque applied to the winding shaft 7 in the winding-up direction by a return spring. The flexible planar structure 8 has a dimensionally stable guiding profile 9 on its face end region that is in front in the pull-out direction, which guiding profile extends over an entire width of the flexible planar structure 8 and is guided on its opposite face end regions 10 in loading compartment-fixed guiding tracks 11 in the form of guiding rails for parallel displacement. The guiding tracks 11 extend approximately on the level of the longitudinal slot of the cartridge housing 6 along the respective loading compartment side wall 4 rearwards in the vehicle longitudinal direction, wherein each of the two guiding tracks 11 is guided in the opposite loading compartment side walls 4 at least largely in parallel to the loading compartment floor 5. The two guiding tracks 11 are integrated in the loading compartment side walls 4 and firmly connected to supporting structure parts of the vehicle bodywork. The two guiding tracks 11 extend over the length of the loading compartment.

In each guiding track 11 is guided a respective entrainer 12 which is shiftable towards the front in the longitudinal direction of the vehicle and towards the rear in the longitudinal direction of the vehicle via a drive system (shown diagrammatically only in FIG. 1) along the respective guiding track 11. Both entrainers 12 are shiftable in mutual synchronization in the opposite guiding tracks 11 by means of the drive system. The drive system includes an electric motor and flexible drive transmission means in the form of threaded helix cables or in the form of flexible toothed racks which are driven in synchronization and in opposite directions by means of an appropriate gearing mechanism via the electric motor. The drive transmission means are connected to the respective entrainer 12 so that a displacement of the drive transmission means necessarily causes the desired displacement of the entrainers 12 in the guiding tracks 11. The general shifting function and the accommodating, entraining and releasing functions of the entrainers in the longitudinal direction of the vehicle correspond to the functions as described in EP 1 084 907 A2 for all embodiments according to FIGS. 1 to 11.

The entrainers 12 entrain the opposite face end regions 10 by means of a respective retaining device acting in a force-limited manner. In the embodiment according to FIGS. 2 to 4, the retaining device acting in a force-limited manner is disposed on the respective entrainer 12. The retaining device acting in a force-limited manner includes two leaf spring legs 13 which are fixedly clamped unilaterally on the entrainer 12 and are open towards the cartridge housing 6, i.e. towards the winding shaft 7, in order to allow force-limited accommodation or release of the respective face end region 10 of the guiding profile 9. On each face end region 10 of the guiding profile 9 is provided a coupling member 14 to 16, which has a mushroom head 14 with a rectangular-type outer contour, a support pin 15 extending in parallel to a central longitudinal axis of the guiding profile 9, and an eccentric plate 16, with the support pin 15 protruding therefrom. The eccentric plate 16 is connected to the guiding profile 9 for conjoint rotation. The support pin 15 is firmly disposed on the eccentric plate 16 and the mushroom head 14 is fixed on the face side of a free end region of the support pin 15 protruding away from the eccentric plate 16. In the exemplary embodiment as illustrated, the mushroom head 14, the support pin 15 and the eccentric plate 16 are configured in an integral manner. The eccentric plate 16 is fixed to the guiding profile 9 on a face side.

The mushroom head 14 has, as apparent with reference to FIG. 4, an outer contour provided with two wider edge legs and, approximately at right angles thereto, two narrower edge legs. The two shorter edge legs present a wider engagement surface, when the mushroom head 14 is oriented upright according to FIG. 4. The two longer edge legs present a narrow engagement surface of the mushroom head 14 when the mushroom head 14 is turned about 90°. The narrow engagement surface is configured such that the mushroom head 14 in said narrower orientation, i.e. in the horizontal orientation of its wider engagement surface, can freely slide out between the opposite leaf spring legs 13 of the retaining device acting in a force-limited manner, without the leaf spring legs 13 causing form-fitted support. In the upright orientation, wherein the wide engagement surface of the mushroom head 14 is effective according to FIG. 4, the leaf spring legs 13 form force-limited, form-fitted support. The force-limitation is provided by the elastic bending force of the leaf spring legs 13.

During ordinary operation of the protection device 3, the guiding profile 9 is oriented according to FIG. 4 such that the eccentric plate 16 extends forward relative to the rearward extended planar structure 8 and the support pin 15 of each coupling member is positioned spaced in parallel in front of the central longitudinal axis of the guiding profile 9. In said orientation, the mushroom head 14 of the coupling member is upright oriented and latched between the leaf spring legs 13 of the retaining device acting in a force-limited manner of the respective entrainer 12. Once a strain load with a directional component occurs towards the top or towards the bottom, intentionally or unintentionally by an operator (cf. arrow illustration in FIG. 4), owing to the eccentric arrangement of the support pin 15, there is necessarily torque exerted on the eccentric plate 16, on the support pin 15 and on the mushroom head 14 and, thus, on the coupling member in total (cf. arrow illustration in FIG. 4), whereby the mushroom head 14 turns by 90° within the retaining device acting in a force-limited manner of the respective entrainer 12. As a result, the mushroom head 14 and, thus, the respective coupling member comes clear from the entrainer 12, whereby the planar structure 8, permanently applied with force in the winding-up direction by the return spring of the winding shaft, draws the guiding profile 9 to the rear towards the cartridge housing 6, i.e. to the front in the vehicle longitudinal direction. The tensile force acting on the guiding profile 9 via the planar structure 8 turns the guiding profile 9 and, consequently, also the coupling members 14 to 16 on the opposite face end regions 10 of the guiding profile 9 necessarily back to the orientation according to FIG. 4, wherein the respective mushroom head 14 is in an upright location and the support pin 15 is positioned in front of the guiding profile 9.

The embodiments according to FIGS. 5 to 11 are employable with the protection device 3 according to FIG. 1 in the same way as the above described guiding profile 9. Parts and portions of the same functionality are consequently marked with the same reference numerals with the letters "a" or "b" added. An essential difference of the two embodiments according to FIGS. 5 to 11 is in that the retaining devices acting in a force-limited manner, which are effective between the entrainers 12a, 12b shiftable in the loading compartment-fixed guiding tracks 11 and the coupling members of the opposite face end regions 10a, 10b attached to the guiding profile 9a, are associated with the face end regions 10a, 10b of the respective guiding profile 9a, 9b.

In the embodiment according to FIGS. 5 to 7, the respective entrainer 12a, which is shiftable within the respective guiding track 11, includes an entrainer pin protruding inwards in the vehicle transverse direction, which pin is in form-fitting contact with the corresponding retaining device acting in a force-limited manner on the coupling member of the respective face end region 10a. The retaining device acting in a force-limited manner is constituted by a retaining leg 17 rotationally movable in a force-limited manner, which leg is mounted for limited rotation about a rotational axis D on the face end region 10a firmly attached to the guiding profile 9a. The retaining leg 17 forms a ratchet which is positioned in the region of a top side of the face end region 10a. The retaining leg 17 operatively interacts with a counter support 18 which presents a guiding surface for the entrainer pin of the entrainer 12a. With reference to FIGS. 6 and 7, it is apparent that the entrainer pin is retained on the counter support 18 and the retaining leg 17 eccentrically offset in relation to a central longitudinal axis of the guiding profile 9a. The retaining leg 17 can additionally be spring-loaded in the closing direction. Preferably, spring loading is by a leg spring which is effective coaxially in relation to the rotational axis D between the face end region 10a of the guiding profile 9a and the retaining leg 17. The rotational axis D is positioned in parallel, however, eccentric in relation to the central longitudinal axis of the guiding profile 9a.

During ordinary operation, the entrainer pins of the entrainers 12a entrain the respective face end region 10a of the guiding profile 9a according to FIG. 6. Once a strain load is exerted on the guiding profile 9a from above, the retaining leg 17 can draw aside towards the top, according to FIG. 7, whereby the entrainer bolt of the entrainer 12a can come clear of the respective face end region 10a passing between the counter support 18 and the retaining leg 17. The planar structure 8 engages on the guiding profile 9a in the illustrations according to FIGS. 6 and 7 on the right-hand side of the drawing layer so that the return force acting on the planar structure 8 supports release of the respective entrainer pin of the entrainers 12a.

In the embodiment according to FIGS. 8 to 11, the respective retaining device acting in a force-limited manner is likewise associated with the respective coupling member of the respective face end region 10b of the guiding profile 9b. The two entrainers, which are shiftable within loading compartment-fixed guiding tracks 11, are provided merely with plain entrainer pins 12b protruding in the vehicle transverse direction inward towards the center of the loading compartment. Each coupling member on the opposite face end regions 10b of the guiding profile 9b has a support section 19 firmly connected to the guiding profile 9b and a claw section 20 mounted on the support section 19 to be rotating about a rotational axis 21, which claw section is provided with the retaining device acting in a force-limited manner. The retaining device acting in a force-limited manner is a leaf spring 22 defining a latching recess for the entrainer pin of the entrainer 12b which is open towards one side (cf. FIGS. 9 to 11). The claw section 20 is also open towards one side in analogy to the opening of the leaf spring 22.

The rotational axis 21 is positioned on the retaining section 19 axially parallel offset in relation to a central longitudinal axis of the guiding profile 9b above the central longitudinal axis of the guiding profile 9b. The leaf spring 22 is positioned in the rotatable claw section 20, according to FIG. 11, and can be turned together with the latter. Owing to the return force of the return spring of the winding shaft, the planar structure 8 exerts a tensional load on the guiding profile 9b in a direction that is opposed to the opening of the leaf spring 22 and the claw section 20 and, thus, towards the left hand side in the drawing layer according to FIGS. 10 and 11.

Once an intentional or unintentional strain load with a directional component in the vertical direction of the vehicle acts on the guiding profile 9b towards the top or towards the bottom, the claw section 20 together with the leaf spring 22 turns correspondingly, whereby the entrainer pin of the respective entrainer 12b can come clear of the claw section 20.

The invention claimed is:

1. A protection device for a vehicle interior compartment, comprising a flexible planar structure displaceable between a rest position and a protective position, the planar structure having an end region provided with a dimensionally stable guiding profile, the guiding profile being guided in vehicle-fixed guiding tracks on opposite sides thereof, each side of the guiding profile being associated with a coupling member in operative connection with an entrainer guided in the respective guiding track by a retaining device acting in a force-limited manner, the entrainers being shiftable in mutual synchronization within the guiding tracks by a drive system, the coupling members being in operative connection with the entrainers eccentrically offset in relation to a central longitudinal axis of the guiding profile, the coupling members being removable from the entrainers in response to external strains exerted on the guiding profile with directional components orthogonal to a plane of deployment of the planar structure, each retaining device being disposed on the respective coupling member or on the respective entrainer for rotation about a rotational axis oriented in parallel to the central longitudinal axis of the guiding profile, each retaining device including at least one unilaterally clamped leaf spring.

2. The protection device according to claim 1, wherein the coupling members are fixedly disposed on the guiding profile.

3. The protection device according to claim 1, wherein each leaf spring flanks an outer contour of the respective entrainer.

4. The protection device according to claim 1, wherein each retaining device is disposed on the respective coupling member.

5. The protection device according to claim 1, wherein each entrainer comprises a pin projecting inwardly in a direction transverse to the guiding tracks.

6. The protection device according to claim 5, wherein each leaf spring defines a latching recess configured to receive the pin of the respective entrainer.

7. The protection device according to claim 6, further including a housing and a winding shaft mounted for rotation within the housing, the planar structure being fixed to the winding shaft and being windable about the winding shaft and unwindable therefrom, the end region of the planar structure being fixed to the guiding profile and being a leading end region of the planar structure with respect to a direction of movement thereof, the latching recess opening in a direction towards the winding shaft.

* * * * *